Patented Sept. 8, 1925.

1,552,549

UNITED STATES PATENT OFFICE.

BENJAMIN L. EICHER, OF CHICAGO, ILLINOIS, ASSIGNOR TO T. S. DONAHUE, WM. BLAIR BAGGALEY, O. B. WINTERS, A. H. KUDNER, AND L. R. WASEY, ALL OF CHICAGO, ILLINOIS.

PROCESS FOR MAKING COD-LIVER-OIL TABLETS.

No Drawing.   Application filed May 12, 1924. Serial No. 712,555.   REISSUED

*To all whom it may concern:*

Be it known that I, BENJAMIN L. EICHER, a citizen of the United States, and a resident of the city of Chicago, in the county of Cook and State of Illinois, have invented certain new and useful Improvements in a Process for Making Cod-Liver-Oil Tablets; and I do hereby declare that the following is a full, clear, and exact description of the same.

This invention relates to the manufacture of pills more particularly pills having an oily material as one of the principal ingredients.

One of the difficulties hitherto encountered in connection with making pills is the incorporation with the other ingredients of oily materials such as cod liver oil extractives.

It is an object, therefore, of the present invention to provide an improved process for making pills, more particularly pills having an oil material as one of the principal ingredients.

Other and further important objects of the invention will be apparent from the disclosures in the following description, which sets forth the preferred form of the invention.

According to the preferred form of the invention reduced iron, zinc phosphide, berberine sulphate and strychnine sulphate are mixed in a ball mill with sufficient charcoal to get a thorough mixture. The balance of the charcoal desired is then added and uniformly incorporated in the mixture. Then a solution of oleoresin of ginger in ether is added and the whole thoroughly mixed.

The next step is to reduce the material into granular form which may conveniently be done by rubbing it through a screen. The granules so made are dried and then again passed through the screen and compressed into 3½ grain tablets. In the compression step the pressure should not be greater than is required to make a coherent mass since the pills should be porous to absorb a solution of cod-liver oil extractives in ether.

The pills after compression are placed in a percolator and a solution of cod-liver oil extractives in about twice their weight of ether is poured over the pills. The solution flowing through the percolator is caught and repassed through the pills until all has been absorbed. The pills are then dried to remove the ether when they are ready to coat.

The pills may conveniently be coated in a pan with simple syrup. Next a thin coating of dry powdered (granulated) acacia is applied. The pills are dried and the coating operations are repeated. After further drying they are sugar coated brown or any other desired color.

The proportions of the ingredients used is preferably kept within the following limits.

|                       | Per cent.    |
|-----------------------|--------------|
| Cod liver oil extractives | 7 to 30   |
| Reduced iron          | 1 to 8       |
| Zinc phosphide        | 0.5 to 3     |
| Berberine sulphate    | 0.1 to 0.6   |
| Strychnine sulphate   | 0.01 to 0.06 |
| Oleoresin of ginger   | 0.1 to 0.6   |
| Powdered charcoal     | 50 to 75     |

Proportions which have been found especially suitable are the following:

|                       | Per cent. |
|-----------------------|-----------|
| Cod liver oil extractives | 25.300 |
| Reduced iron          | 5.375     |
| Zinc phosphide        | 1.380     |
| Berberine sulphate    | 0.400     |
| Strychnine sulphate   | 0.025     |
| Oleoresin of ginger   | 0.320     |
| Charcoal              | 67.200    |
|                       | 100.000   |

Various of these ingredients may be omitted if desired without changing the process in any way. Further, other absorbent materials than charcoal may in some cases be employed. Also other volatile solvents than ether may be used in certain cases.

It will also be evident that several of the numerous steps in the process may be omitted or modified without changing the essential principles of the invention. Thus in place of a percolator the pills and solution of cod-liver oil extractives might be placed in a tumbling barrel to incorporate the latter in the pills. A percolator is preferred, however, as there is less tendency to break the pills.

I am aware that numerous details of this process may be varied through a wide range without departing from the principles of this invention, and I therefore do not purpose limiting the patent granted, otherwise than necessitated by the prior art.

I claim as my invention:

1. A process for making pills comprising mixing charcoal with certain of the ingredients, forming the mixture into pill form, then applying to the pills a solution of the other constituents in a volatile solvent and evaporating the solvent.

2. A process for making pills comprising forming charcoal pills, then applying to the pills a solution of an oily material in a volatile solvent and evaporating the solvent.

3. A process for making pills comprising forming charcoal pills, then applying to the pills a solution of cod liver oil extractives in a volatile solvent and evaporating the solvent.

4. A process for making pills comprising forming charcoal pills, then applying to the pills a solution of cod-liver oil extractives in ether and evaporating the ether.

5. A process for making pills comprising mixing charcoal with a solution of a sticky material in a volatile solvent, granulating and drying the mixture, forming the dry mixture into pills by pressure, then applying to the pills a solution of cod liver oil extractives in a volatile solvent and evaporating the solvent.

6. A process for making pills comprising mixing charcoal, reduced iron, zinc phosphide, berberine sulphate and strychnine sulphate, and a solution of oleoresin of ginger in ether, granulating and drying the mixture, forming the dry mixture into pills by pressure, then applying to the pills a solution of cod liver oil extractives in ether and evaporating the ether.

In testimony whereof I have hereunto subscribed my name.

BENJAMIN L. EICHER.